US011031805B2

(12) United States Patent
Yang et al.

(10) Patent No.: US 11,031,805 B2
(45) Date of Patent: Jun. 8, 2021

(54) POWER CONTROLLER, POWER SUPPLY SYSTEM AND DEVICE AND CONTROL METHOD THEREOF

(71) Applicant: Asia Pacific Fuel Cell Technologies, Ltd., Miaoli (TW)

(72) Inventors: Jefferson YS Yang, Orange, CA (US); Chin-Feng Hsu, Miaoli (TW)

(73) Assignee: ASIA PACIFIC FUEL CELL TECHNOLOGIES, LTD., Miaoli (TW)

( * ) Notice: Subject to any disclaimer, the term of this patent is extended or adjusted under 35 U.S.C. 154(b) by 359 days.

(21) Appl. No.: 16/133,239

(22) Filed: Sep. 17, 2018

(65) Prior Publication Data

US 2019/0089190 A1 Mar. 21, 2019

(30) Foreign Application Priority Data

Sep. 18, 2017 (TW) .................................. 10613199.5

(51) Int. Cl.
*H02J 7/04* (2006.01)
*H01M 10/44* (2006.01)
*H02J 7/00* (2006.01)

(52) U.S. Cl.
CPC ............. *H02J 7/045* (2013.01); *H01M 10/44* (2013.01); *H02J 7/007* (2013.01); *H02J 7/00718* (2020.01); *H02J 2207/20* (2020.01); *H02J 2207/40* (2020.01)

(58) Field of Classification Search
CPC ........................................................ H02J 7/045
USPC ............................................................ 320/162
See application file for complete search history.

(56) References Cited

U.S. PATENT DOCUMENTS

| 7,259,972 | B2 * | 8/2007 | Yang | .......................... 363/21.13 |
| 9,160,233 | B2 * | 10/2015 | Tsai | ........................ H02M 3/24 |
| 2005/0219870 | A1 * | 10/2005 | Yang | ................. H02M 3/33507 363/21.01 |

* cited by examiner

*Primary Examiner* — Jerry D Robbins
(74) *Attorney, Agent, or Firm* — Kirton McConkie; Evan R. Witt

(57) ABSTRACT

The present invention provides a power controller, a power supply system and device and control method thereof. The power command value is adjusted according to the state of the power supply system and the characteristic of the secondary battery. When the converting power of the power converter is larger than or equal to the power command value, or when the charging current is smaller than the minimum charging current, the power controller performs the power adjusting mode for providing the first preset output current value. The power converter adjusts the converting power according to the first preset output current value. When the charging current is larger than or equal to the maximum charging current, the power controller performs the charging control mode for providing the second preset output current value. The power converter adjusts the output current according to the second preset output current value.

28 Claims, 10 Drawing Sheets

POWER CONTROLLER, POWER SUPPLY SYSTEM AND DEVICE AND CONTROL METHOD THEREOF

CROSS-REFERENCE TO RELATED APPLICATION

This application claims priority to Taiwan Patent Application No. 106131995, filed on Sep. 18, 2017, the entire content of which is incorporated herein by reference for all purposes.

FIELD OF THE INVENTION

The present invention relates to a power controller, a power supply system and device and control method thereof, and more particularly to a power controller, a power supply system and device and control method thereof including a single power converter, wherein the converting power and the output current of the power converter are controlled to protect the power supply equipment and the secondary battery respectively.

BACKGROUND OF THE INVENTION

Fuel cells are widely utilized in power supply system. Taking electric vehicle as an example, the conventional power supply system includes a secondary battery, a fuel cell, a load and two power converters. The fuel cell is a main power source, and the secondary battery provides the backup power and buffer. The first power converter converts the power provided by the fuel cell for supplying power. The secondary battery is charged by the power converted by the second power converter, and the second battery is allowed to provide the power to the load.

Due to the output characteristic of fuel cell, the voltage decreases suddenly and abnormally if the power of fuel cell stack is not well controlled to lighten the burden. Moreover, this phenomenon may cause permanent damage or temporary inactive, and the power supply system is led to emergency stop state. In the conventional power supply system, it is a tendency to adjust the output power of the power converter. However, while adjusting the output power, the charging current received by the secondary battery may exceed the upper limit current and damage the secondary battery.

Furthermore, in the conventional power supply system including fuel cell, secondary battery and load, since the power supply system has to utilize at least two power converters, the cost and the volume are increased.

Therefore, there is a need of providing a power controller, a power supply system and device and control method thereof for overcoming the above drawbacks.

SUMMARY OF THE INVENTION

Definition of technology nouns:
1. input voltage feedback value $V_{fb1}$: the input voltage feedback value reflecting the input voltage $V_1$
2. output voltage feedback value $V_{fb2}$: the output voltage feedback value reflecting the output voltage $V_2$
3. input current feedback value $I_{fb1}$: the input current feedback value reflecting the input current $I_1$
4. output current feedback value $I_{fb2}$: the output current feedback value reflecting the output current $I_2$
5. charging current feedback value $I_{fb3}$: the charging current feedback value reflecting the charging current $I_3$
6. converting voltage $V_c$: the input voltage $V_1$ or the output voltage $V_2$ (to be determined according to the state of the power supply system)
7. converting current $I_c$: the input current $I_1$ or the output current $I_2$ (to be determined according to the state of the power supply system)
8. converting voltage feedback value $V_{fbc}$: the voltage feedback signal needed by the power controller 13 and also the voltage feedback value reflecting the converting voltage $V_c$
9. converting current feedback value $I_{fbc}$: the current feedback signal needed by the power controller 13 and also the current feedback value reflecting the converting current $I_c$
10. converting power $P_c$: the converting power of the power converter 11 and can be the input power $P_i$ or the output power $P_o$ (to be determined according to the state of the power supply system)
11. load demand: the demand provided by the load module An object of the present invention is to provide a power supply system and device and control method thereof for dynamically adjusting the converting power of the power converter and preventing the charging current received by the secondary battery from exceeding the upper limit current, so as to overcome the drawbacks of the conventional power supply system.

Another object of the present invention is to provide a power supply system with a power controller and device and control method thereof. In order to overcome the disadvantages of increased manufacturing cost and volume caused by using at least two power converters in the power supply system, because of the secondary battery need to be protected and the power supply equipment also need to be controlled in stability and reliability.

In accordance with an aspect of the present invention, a power controller for a power supply system is provided. The power controller provides a power adjusting mode and/or a charging control mode, so as to control a converting power or an output current of a power converter correspondingly.

Regarding the said power controller, when the converting power of the power converter is larger than or equal to the power command value, or when the charging current is smaller than the minimum charging current, the power controller performs the power adjusting mode for adjusting the converting power of the power converter.

Regarding the said power controller, when the charging current provided by the power converter is larger than or equal to the maximum charging current, the power controller performs the charging control mode for adjusting the output current of the power converter.

In accordance with another aspect of the present invention, a power supply system is provided. The power supply system at least comprises a power converter, a secondary battery and a power controller. The power converter is configured to receive and convert an input voltage and an input current into an output voltage and an output current. A converting power of the power converter equals the product of a converting voltage and a converting current. The secondary battery is connected to the power converter and configured to receive a charging current provided by the output current. The power controller is connected to the power converter and the secondary battery. The power controller is configured to receive a converting voltage feedback value, a converting current feedback value, a charging current feedback value and a power command value and preset a maximum charging current and a minimum charging current according to a characteristic of the secondary battery. When the converting power of the power converter is larger than or equal to the power command value, the power controller is controlled to perform a power adjusting mode for adjusting the converting power of the power converter. When the charging current is larger than or equal to the maximum charging current, the power controller is controlled to perform a charging control mode for adjusting the output current of the power converter.

Regarding the said power supply system, when the charging current is smaller than the minimum charging current, the power controller further judges and performs the power adjusting mode for adjusting the converting power of the power converter.

Regarding the said power supply system, the power adjusting mode is realized by the power control device. The charging control mode is realized by the charging control device. The power command value is determined according to the load demand or the input voltage provided by the power supply equipment. The voltage gain is determined according to the converting voltage. The power controller can preset and receive the charging current threshold value.

Regarding the said power supply system, further comprises the load module, the power supply equipment and the power supply controller. The load module provides the load demand. The power supply equipment is configured to provide the input voltage and the input current. The power supply controller is connected to the power supply equipment, the power converter, the power controller and the load module. The power supply controller is configured to generate the power command value according to the input voltage feedback value, the output voltage feedback value and the load demand. The power supply controller presets the charging current threshold value and the preset voltage value according to the characteristic of the secondary battery.

The above contents of the present invention will become more readily apparent to those ordinarily skilled in the art after reviewing the following detailed description and accompanying drawings, in which:

DETAILED DESCRIPTION OF THE PREFERRED EMBODIMENT

Figure 1:
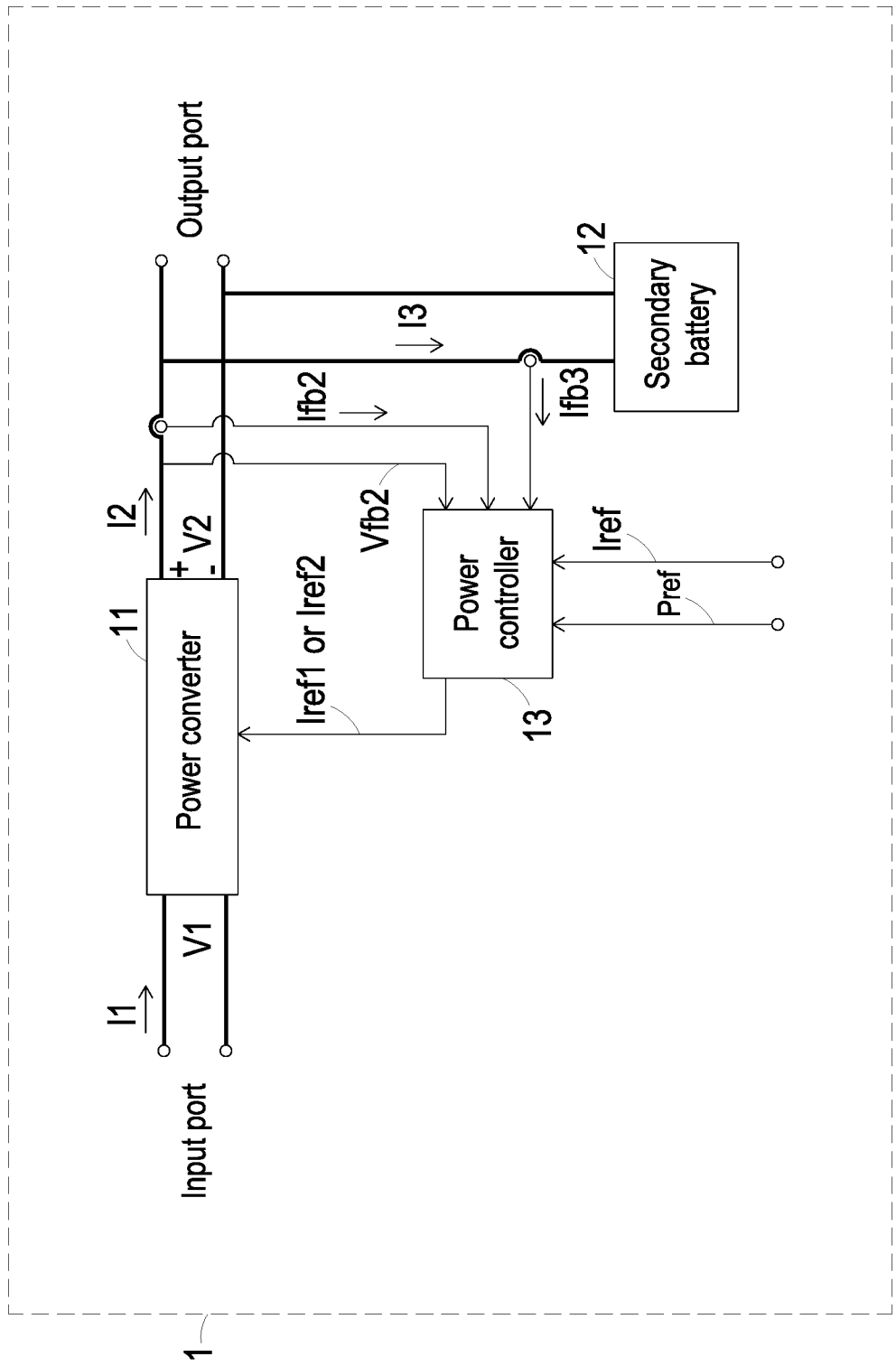
FIG. 1 is a system block diagram illustrating a power supply system according to a first preferred embodiment of the present invention.

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed. In addition, all connections among the following elements in the circuit can be electrical connection, and descriptions thereof are omitted FIG. 1 is a system block diagram illustrating a power supply system according to a first preferred embodiment of the present invention. The power supply system 1 at least includes a power converter 11, a secondary battery 12 and a power controller 13. The power converter 11 is configured to convert the input voltage V1 and the input current I1 of the input port into the output voltage V2 and the output current I2 of the output port. The product of the converting voltage Vc and the converting current Ic is the converting power Pc of the power converter 11. The secondary battery 12 is connected to the output port of the power converter 11 and receives the charging current I3 provided by the output current I2. The power controller 13 is connected to the power converter 11 and the secondary battery 12. The power controller 13 is configured to receive the output voltage feedback value Vfb2, the output current feedback value Ifb2, the charging current feedback value Ifb3, the charging current threshold value Iref and the power command value Pref. In addition, the power controller 13 is configured to set the maximum charging current and the minimum charging current according to the characteristic of the secondary battery 12. When the converting power Pc of the power converter 11 is larger than or equal to the power command value Pref, or when the charging current I3 is smaller than the minimum charging current, the power controller is controlled to perform a power adjusting mode. The power controller 13 provides a first preset output current value Iref1 according to the output voltage feedback value Vfb2, the output current feedback value Ifb2 and the power command value Pref. The power converter 11 adjusts the converting power Pc according to the first preset output current value Iref1. When the charging current I3 is larger than or equal to the maximum charging current, the power controller 13 is controlled to perform a charging control mode. The power controller 13 provides a second preset output current value Iref2 according to the charging current feedback value Ifb3 and the charging current threshold value Iref. The power converter 11 adjusts the output current I2 according to the second preset output current value Iref2. The charging current threshold value Iref can be preset by the power controller 13 itself instead of being inputted.

Figure 2:
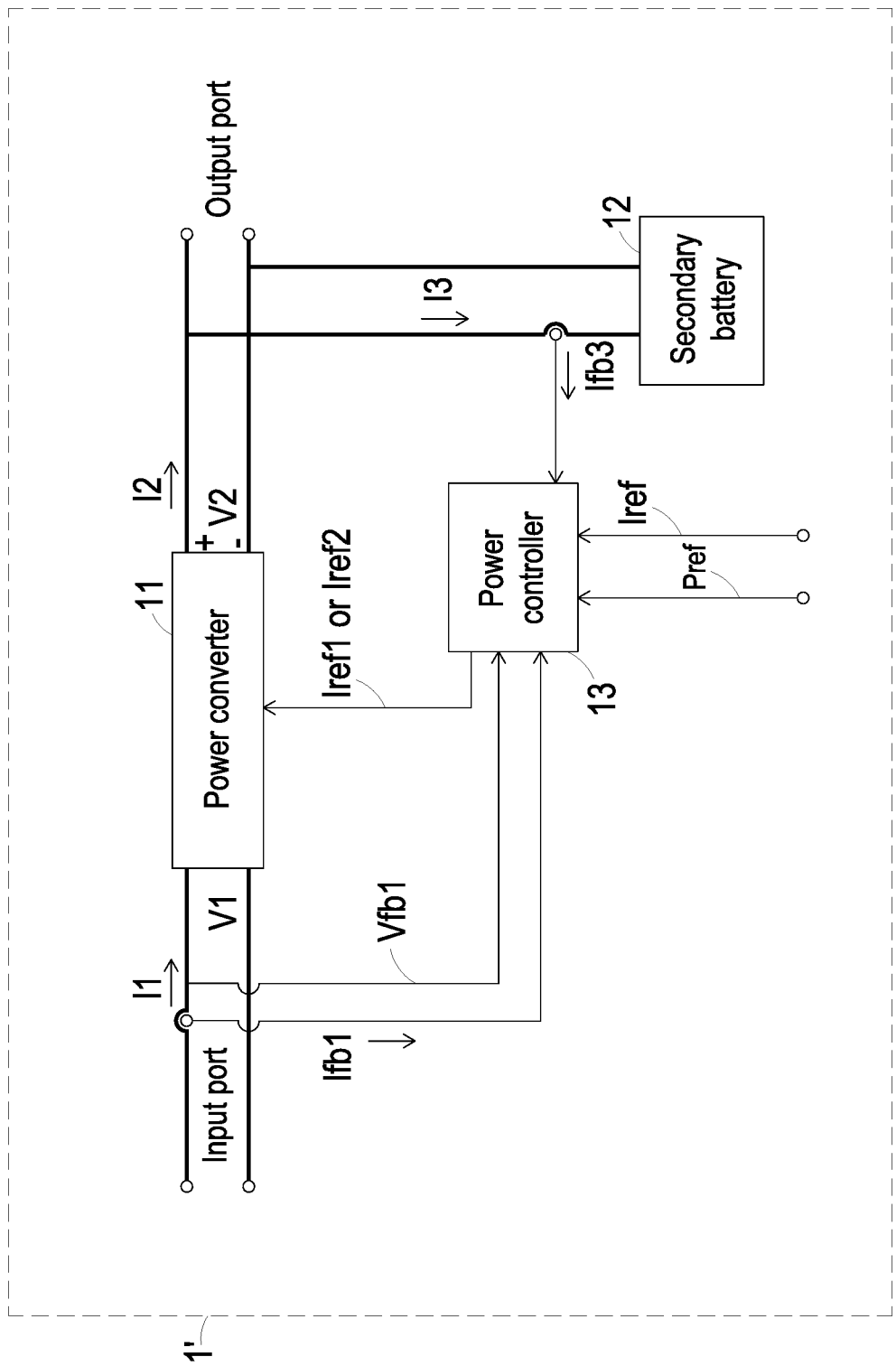
FIG. 2 is another exemplary system block diagram illustrating the power supply system of FIG. 1.

FIG. 2 is another exemplary system block diagram illustrating the power supply system of FIG. 1. The power supply system 1' of FIG. 2 is similar to the power supply system 1 of FIG. 1, and the differences therebetween are described below. In the power supply system 1', the power controller 13 is controlled in accordance with the input power Pi. Namely, the input power Pi (i.e., the converting power Pc) of the power converter 11 is calculated from the input voltage V1 and the input current I1 of the input port. In addition, the input signal of the power controller 13 is changed to the input voltage feedback value Vfb1 (i.e., the converting voltage feedback value Vfbc) and the input current feedback value Ifb1 (i.e., the converting current feedback value Ifbc). The unmentioned connections and functions of the components of the power supply system 1' of FIG. 2 is the same with that of the power supply system 1 of FIG. 1, and detailed descriptions thereof are omitted. The circuits shown in FIGS. 1 and 2 is chosen and varied according to actual requirements during practical application.

Figure 3:
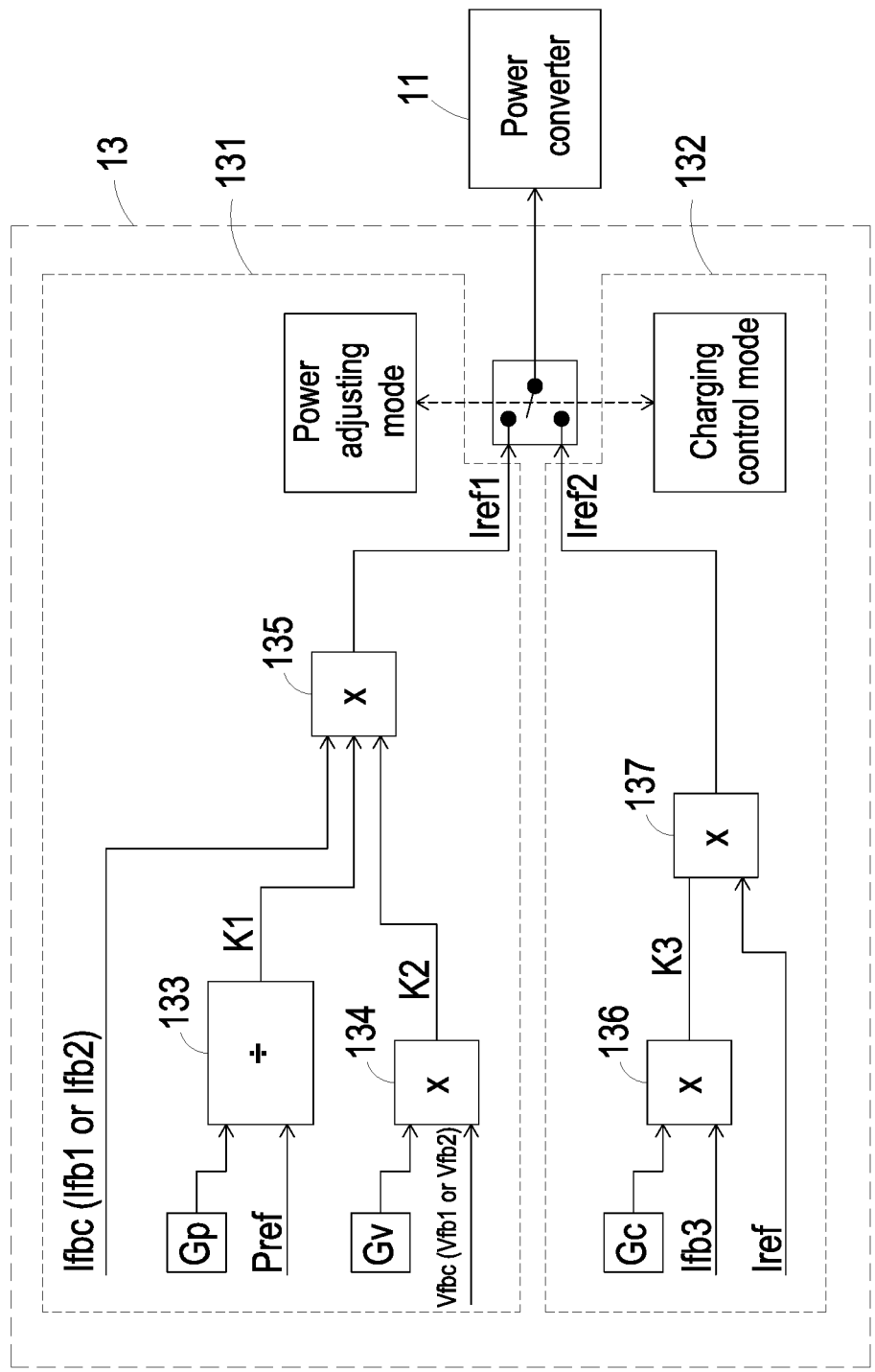
FIG. 3 is a arithmetic block diagram showing the operation of the power controller of FIGS. 1 and 2.

FIG. 3 is a arithmetic block diagram showing the operation of the power controller of FIGS. 1 and 2. In fact, the first preset output current value Iref1 and the second preset output current value Iref2 outputted by the power controller 13 is applied in the power adjusting mode and the charging control mode respectively. According to the state of the power supply systems 1 and 1', the variation of the converting voltage Vc and the converting current Ic, and the characteristic of the second battery 12, the power controller 13 adjusts the converting current Ic based on the actual converting voltage Vc. That is, the converting power Pc is adjusted, or the charging current I3 received by the secondary battery 12 is controlled. The power controller 13 at least includes a power control device 131 and a charging control device 132. The power control device 131 at least includes a divider 133, a first multiplier 134 and a second multiplier 135. The divider 133 receives a power gain Gp and the power command value Pref and outputs a first power parameter K1. The first power parameter K1 equals the power gain Gp divided by the power command value Pref. The first multiplier 134 receives a voltage gain Gv and the converting voltage feedback value Vfbc and outputs a second power parameter K2. The second power parameter K2 equals the voltage gain Gv multiplied by the converting voltage feedback value Vfbc. The second multiplier 135 receives the converting current feedback value Ifbc, the first power parameter K1 and the second power parameter K2 and outputs the first preset output current value Iref1. The first preset output current value Iref1 is the product of the converting current feedback value Ifbc, the first power parameter K1 and the second power parameter K2. In addition, the charging control device 132 at least includes a third multiplier 136 and a fourth multiplier 137. The third multiplier 136 receives the current gain Gc and the charging current feedback value Ifb3 and outputs a charging current parameter K3. The charging current parameter K3 equals the current gain Gc multiplied by the charging current feedback value Ifb3. The fourth multiplier 137 receives the charging current parameter K3 and the charging current threshold value Iref and outputs the second preset output current value Iref2. The second preset output current value Iref2 is the product of the charging current parameter K3 and the charging current threshold value Iref. The switching between the first preset output current value Iref1 and the second preset output current value Iref2 is for example but not limited to be realized by mechanical control switch, electromagnetic control switch, logical control switch, control circuit, manual control or automated control. In addition, the voltage gain Gv and the current gain Gc are determined in accordance with the converting voltage Vc and the charging current I3 respectively. The power gain Gp is preset according to the characteristic of the secondary battery 12, and the power gain Gp is adjusted according to the relation between the power gain Gp and the power command value Pref.

Table 1 shows embodiments of the parameters of the power controller 13. In the first embodiment (a), the power command value Pref is 720 W, the power gain Gp is 36, the first power parameter K1 is calculated to be 0.050, the output current feedback value Ifb2 is 20 A, the voltage gain Gv is 0.02778, the output voltage feedback value Vfb2 is 36V, and the second power parameter K2 is calculated to be 1.000. In the power adjusting mode, the first preset output current value Iref1 is calculated to be 1.000. In addition, the charging current feedback value Ifb3 is 5 A, the current gain Gc is 0.0400, the charging current parameter K3 is calculated to be 0.20, and the charging current threshold value Iref is 5 A. In the charging control mode, the second preset output current value Iref2 is calculated to be 1.000. The other embodiments (b) and (c) can be done in the same manner.

TABLE 1 embodiments of the parameters of the power controller

| embodiment | Pref (W) | Gp | Ifb2 (A) | Iref (A) | K1 | K3 | Gv | Gc |
|---|---|---|---|---|---|---|---|---|
| (a) | 720 | 36 | 20 | 5 | 0.050 | 0.20 | 0.02778 | 0.0400 |
| (b) | 2000 | 50 | 40 | 10 | 0.025 | 0.10 | 0.02000 | 0.0100 |
| (c) | 7500 | 75 | 100 | 25 | 0.010 | 0.04 | 0.01333 | 0.0016 |

Note.
Gp = Vfb2; Iref = Ifb3.

Please refer to Table 2. As shown in Table 2, there is another embodiment (b1) of the second power parameter K2 of the power controller 13 based on the embodiment (b) in Table 1. In the embodiment (b1), the power gain Gp is 50, the output voltage feedback value Vfb2 is 45V, the voltage gain Gv is 0.02000, and the second power parameter K2 is calculated to be 0.900. The other embodiments (b2) and (b3) can be done in the same manner.

TABLE 2 embodiments of the second power parameter of the power controller

| embodiment | Gp | Vfb2 (V) | K2 | Gv |
|---|---|---|---|---|
| (b1) | 50 | 45 | 0.900 | 0.02000 |
| (b2) | 50 | 50 | 1.000 | 0.02000 |
| (b3) | 50 | 55 | 1.100 | 0.02000 |

Please refer to Table 3. As shown in Table 3, there is another embodiment (b4) of the charging current parameter K3 of the power controller 13 based on the embodiment (b) in Table 1. In the embodiment (b4), the charging current threshold value Iref is 10 A, the charging current feedback value Ifb3 is 9 A, the current gain Gc is 0.01000, and the charging current parameter K3 is calculated to be 0.0900. The other embodiments (b5) and (b6) can be done in the same manner.

TABLE 3 embodiments of the charging current parameter of the power controller

| embodiment | Iref (A) | Ifb3 (A) | K3 | Gc |
|---|---|---|---|---|
| (b4) | 10 | 9 | 0.0900 | 0.01000 |
| (b5) | 10 | 10 | 0.1000 | 0.01000 |
| (b6) | 10 | 11 | 0.1100 | 0.01000 |

Table 4 shows an exemplary example of the parameters of the power controller 13 according to the power supply system 1' of FIG. 2. In the fourth embodiment (d), the power command value Pref is 720 W, the power gain Gp is 18, the first power parameter K1 is calculated to be 0.0250, the input current feedback value Ifb1 is 40 A, the voltage gain Gv is 0.05556, the input voltage feedback value Vfb1 is 18V, and the second power parameter K2 is calculated to be 1.0. In the power adjusting mode, the first preset output current value Iref1 is calculated to be 1.000. In addition, the charging current feedback value Ifb3 is 5 A, the current gain Gc is 0.0400, the charging current parameter K3 is calculated to be 0.20, and the charging current threshold value Iref is 5 A. In the charging control mode, the second preset output current value Iref2 is calculated to be 1.0. The other embodiments (e) and (f) can be done in the same manner.

TABLE 4 embodiments of the parameters of the power controller

| embodiment | Pref (W) | Gp | Ifb1 (A) | Iref (A) | K1 | K3 | Gv | Gc |
|---|---|---|---|---|---|---|---|---|
| (d) | 720 | 18 | 40 | 5 | 0.0250 | 0.20 | 0.05556 | 0.0400 |
| (e) | 2000 | 25 | 80 | 10 | 0.0125 | 0.10 | 0.04000 | 0.0100 |
| (f) | 7500 | 37.5 | 200 | 25 | 0.0050 | 0.04 | 0.02666 | 0.0016 |

Note.
Gp = Vfb1; Ifb3 = Iref.

Please refer to Table 5. As shown in Table 5, there is another embodiment (e1) of the second power parameter K2 of the power controller 13 based on the embodiment (e) in Table 4. In the embodiment (e1), the power gain Gp is 25, the input voltage feedback value Vfb1 is 22.5V, the voltage gain Gv is 0.04000, and the second power parameter K2 is calculated to be 0.900. The other embodiments (e2) and (e3) can be done in the same manner.

TABLE 5 embodiments of the second power parameter of the power controller

| embodiment | Gp | Vfb1 (V) | K2 | Gv |
|---|---|---|---|---|
| (e1) | 25 | 22.5 | 0.900 | 0.04000 |
| (e2) | 25 | 25 | 1.000 | 0.04000 |
| (e3) | 25 | 27.5 | 1.100 | 0.04000 |

Figure 4:
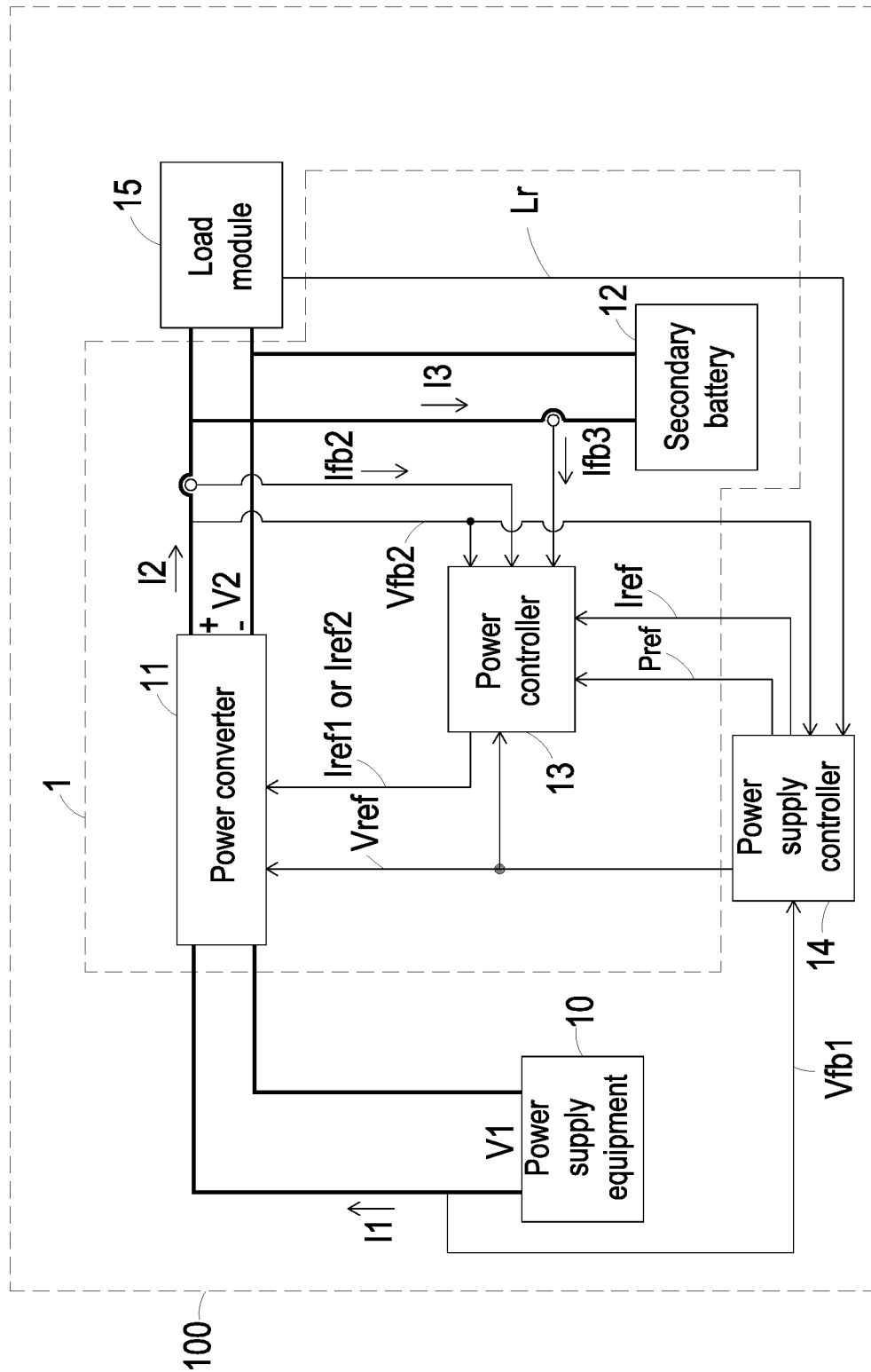
FIG. 4 is a system block diagram illustrating a power supply system according to a second preferred embodiment of the present invention.

FIG. 4 is a system block diagram illustrating a power supply system according to a second preferred embodiment of the present invention. The power supply system 100 at least includes a power supply equipment 10, a power converter 11, a secondary 12, a power controller 13, a power supply controller 14 and a load module 15. The power supply equipment 10 is configured to provide the input voltage V1 and the input current I1. The power converter 11 is connected to the power supply equipment 10 and the load module 15. The power converter 11 is configured to convert the input voltage V1 and the input current I1 provided by the power supply equipment 10 into the output voltage V2 and the output current I2, so as to supply power to the load module 15. The converting power Pc of the power converter 11 is the product of the converting voltage Vc and the converting current Ic. The secondary battery 12 is connected to the power converter 11 and the load module 15. The secondary battery 12 receives the charging current I3 provided by the output current I2 for charging, and discharge the stored power to the load module 15.

The load module 15 is connected to the power converter 11 and the secondary battery 12 for receiving the output voltage V2 and the output current I2 provided by the power converter 11 and providing the load demand Lr. In an embodiment, the load module 15 is for example but not limited to include vehicle power control system, vehicle system with driving controller, motor driver and motor, DC/AC converter and AC load, lighting driver and lighting element, and so on. The load demand Lr is determined according to the signals such as throttle, speed, brake or illumination. Therefore, the load demand Lr is for example but not limited to include load power value, throttle amount, speed value, brake signal value or illumination value. If the load demand Lr is a load power value, the load demand Lr can be provided by a power detector (not shown).

The power supply controller 14 is connected to the power supply equipment 10, the power converter 11, the power controller 13 and the load module 15. The power supply controller 14 generates the power command value Pref according to the input voltage feedback value Vfb1, the output voltage feedback value Vfb2 and the load demand Lr. In addition, the power supply controller 14 presets the charging current threshold value Iref and a preset voltage value Vref according to the characteristic of the secondary battery 12. The charging current threshold value Iref is the maximum current that the secondary battery 12 can bear. Consequently, it is able to judge whether the charging current I3 is too large or not according to the charging current threshold value Iref.

The power controller 13 is connected to the power converter 11, the secondary battery 12, the power supply controller 14 and the load module 15. The power controller 13 receives the output voltage feedback value Vfb2, the output current feedback value Ifb2, the charging current feedback value Ifb3, the charging current threshold value Iref, the power command value Pref and the preset voltage value Vref. The power controller 13 is configured to set the maximum charging current and the minimum charging current according to the characteristic of the secondary battery 12. The power controller 13 can perform the power adjusting mode or the charging control mode. When the power controller 13 judges that the converting power Pc of the power converter 11 is larger than or equal to the power command value Pref, the power controller 13 performs the power adjusting mode. The power controller 13 outputs the first preset output current value Iref1 according to the output voltage feedback value Vfb2, the output current feedback value Ifb2, the power command value Pref and the preset voltage value Vref. The power converter 11 adjusts the converting power Pc according to the first preset output current value Iref1. On the contrary, when the power controller 13 judges that the charging current I3 is larger than or equal to the maximum charging current, the power controller 13 performs the charging control mode. The power controller 13 outputs the second preset output current value Iref2 according to the charging current feedback value Ifb3 and the charging current threshold value Iref. The power converter 11 adjusts the output current I2 according to the second preset output current value Iref2. In addition, the first preset output current value Iref1 (or the second preset output current value Iref2) outputted by the power controller 13 and the preset voltage value Vref outputted by the power supply controller 14 are connected to the signal input port of the power converter 11. After the feedback processing, the output of the power converter 11 is controlled accordingly.

In an embodiment, the power controller 13 judges whether the charging current I3 is smaller than the minimum charging current. Namely, when the power controller 13 judges that the converting power Pc of the power converter 11 is larger than or equal to the power command value Pref, or when the power controller 13 judges that the charging current I3 is smaller than the minimum charging current, the power controller 13 performs the power adjusting mode. Moreover, since the power converter 11 receives the said preset voltage value Vref, the maximum output voltage V2 is controlled to be close to the preset voltage value Vref so as to protect the secondary battery 12 from overcharge voltage. Furthermore, the power gain Gp can be set as the preset voltage value Vref. The output voltage V2 of the power converter 11 can be controlled by the preset voltage value Vref, so as to charge with constant voltage. The charging current I3 of the power converter 11 is controlled by the charging current threshold value Iref, and thus the secondary battery 12 is charged with constant current and is protected from overcharge current. The output of the power converter 11 can be no load. The charging current I3 of the secondary battery 13 equals the output current I2 of the power converter 11. The current gain Gc is determined according to the charging current I3. The charging current threshold value Iref can be preset by the power controller 13 or receives the outer signal.

In addition, the secondary battery is for example but not limited to rechargeable battery such as lithium-ion battery, nickel hydrogen battery, nickel cadmium battery, lead acid battery or super capacitor. The power converter 11 is for example but not limited to boost DC/DC converter, buck DC/DC converter, buck-boost DC/DC converter, AC/DC converter, push-pull DC/DC converter or full-bridge DC/DC converter. The power supply equipment 10 is for example but not limited to the generator equipment, such as fuel cell stack, fuel generator, wind turbine and solar power module.

Figure 5:
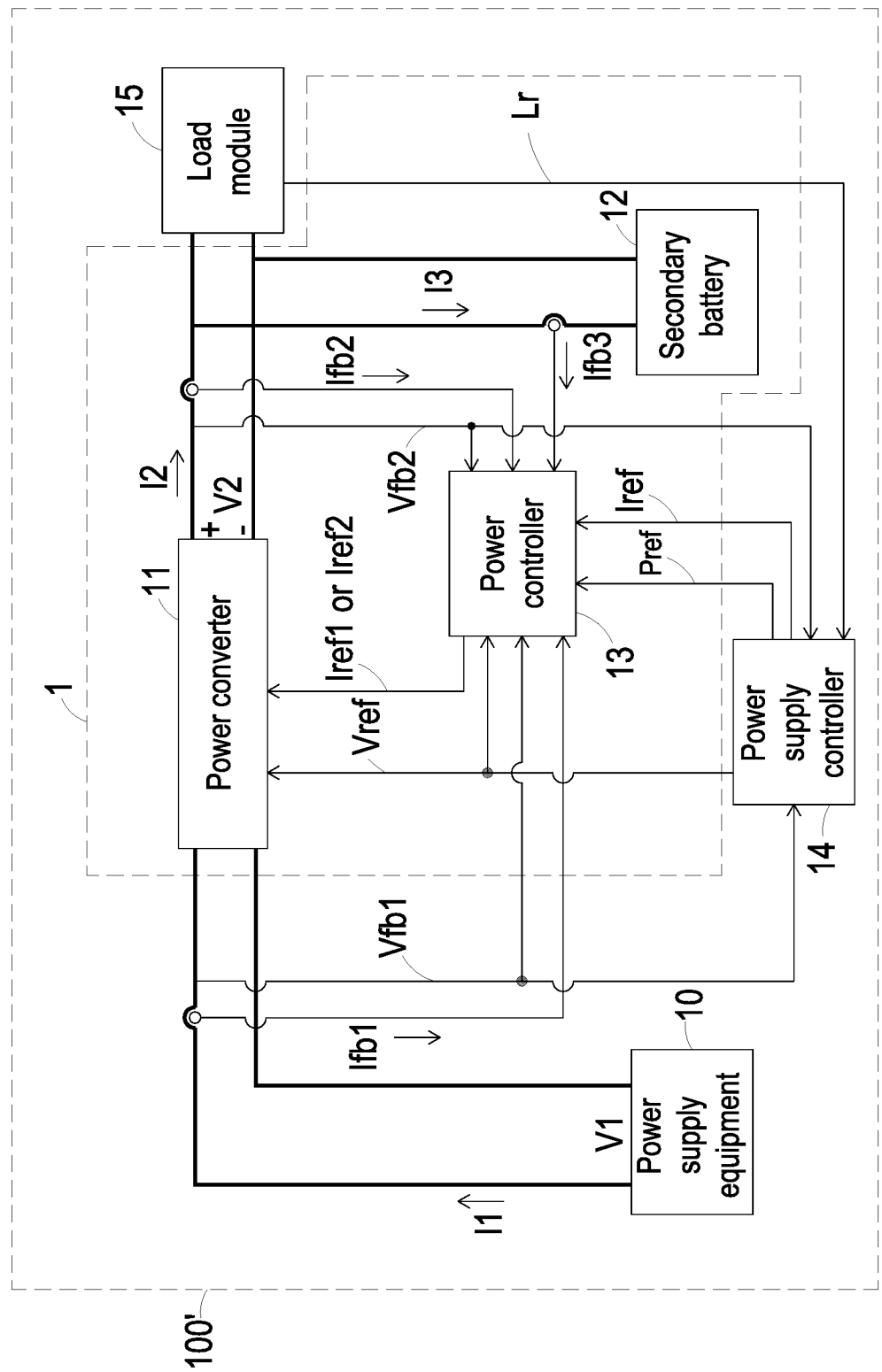
FIG. 5 is another exemplary system block diagram illustrating the power supply system of FIG. 4.

FIG. 5 is another exemplary system block diagram illustrating the power supply system of FIG. 4. The power supply system 100' of FIG. 5 is similar to the power supply system 100 of FIG. 4, and the differences therebetween are described below. In the power supply system 100', the power controller 13 is controlled in accordance with the converting power Pc (i.e., the input power Pi or the output power Po). Namely, the input power Pi of the power converter 11 is calculated from the input voltage V1 and the input current I1, or the output power Po of the power converter 11 is calculated from the output voltage V2 and the output current I2. In addition, the input signal of the power controller 13 is changed to the converting voltage feedback value Vfbc and the converting current feedback value Ifbc (i.e., the input voltage feedback value Vfb1 and the input current feedback value Ifb1, or the output voltage feedback Vfb2 and the output current feedback value Ifb2). The unmentioned connections and functions of the components of the power supply system 100' of FIG. 5 is the same with that of the power supply system 100 of FIG. 4, and detailed descriptions thereof are omitted. In an embodiment, the output voltage feedback Vfb2 and the output current feedback value Ifb2 are omitted. The circuits shown in FIGS. 4 and 5 is chosen and varied according to actual requirements during practical application.

Figure 6:
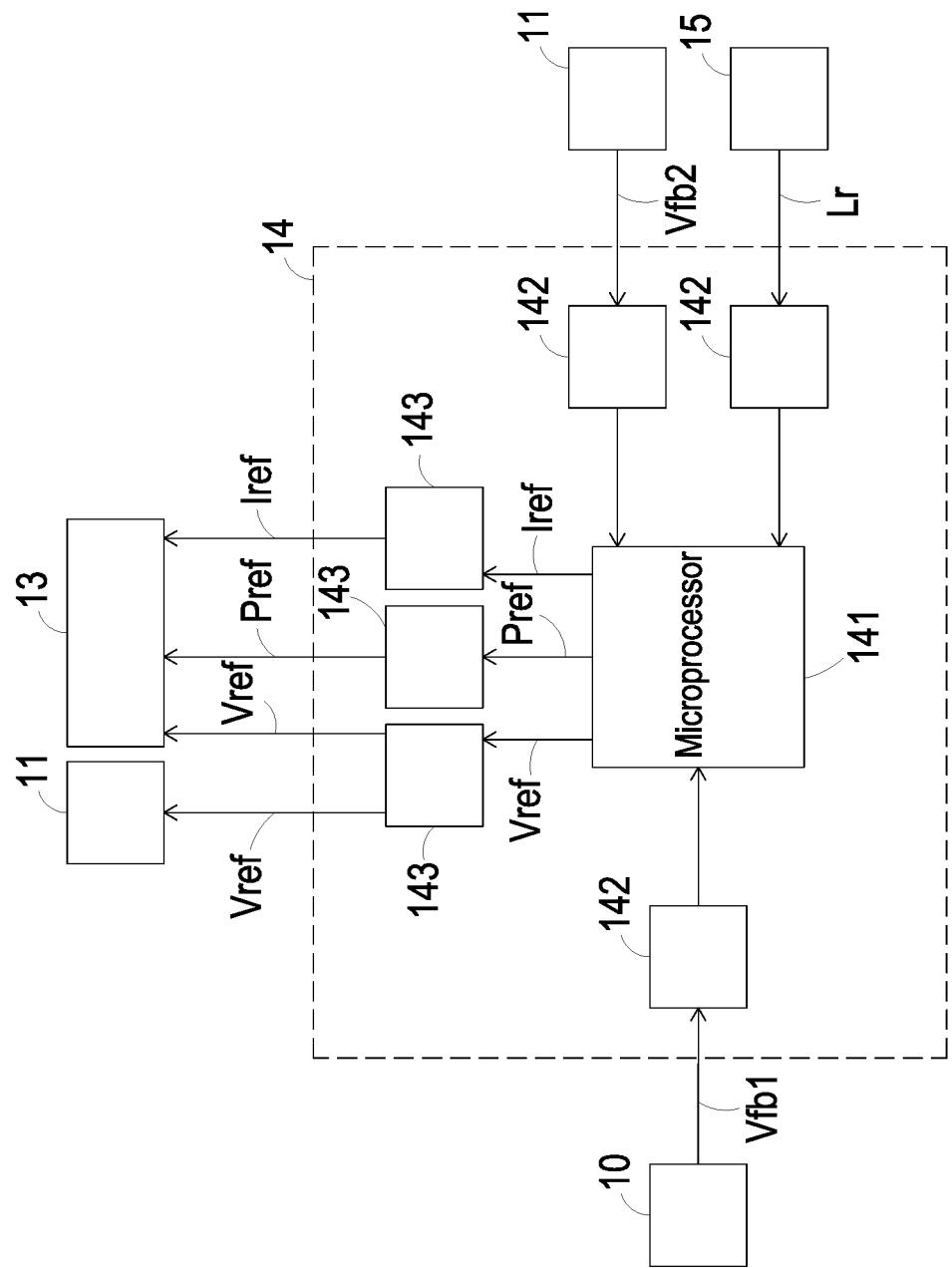
FIG. 6 is a schematic diagram illustrating the inner structure of the power supply controller of FIGS. 4 and 5.

FIG. 6 is a schematic diagram illustrating the inner structure of the power supply controller of FIGS. 4 and 5. The power supply controller 14 at least includes a microprocessor 141, plural first signal converters 142 and plural second signal converters 143. The microprocessor 141 is connected to the power supply equipment 10, the power converter 11 and the load module 15 through the plural first signal converters 142. The plural first signal converters 142 receive and convert the input voltage feedback value Vfb1, the output voltage feedback value Vfb2 and the load demand Lr, and the first signal converters 142 transmit the converted signals to the microprocessor 141 for processing.

As the microprocessor 141 receives the converted signals, the microprocessor 141 generates the power command value Pref correspondingly and presets the charging current threshold value Iref and the preset voltage value Vref according to the characteristic of the secondary battery 12. In addition, the microprocessor 141 is connected to the power converter 11 and the power controller 13 through plural second signal converters 143. The plural second signal converters 143 receives and converts the charging current threshold value Iref, the power command value Pref and the preset voltage value Vref, and the second signal converters 143 transmit the converted signals to the power controller. Meanwhile, the second signal converters 143 transmit the signal of the preset voltage value Vref to the power converter 11.

Figure 7:
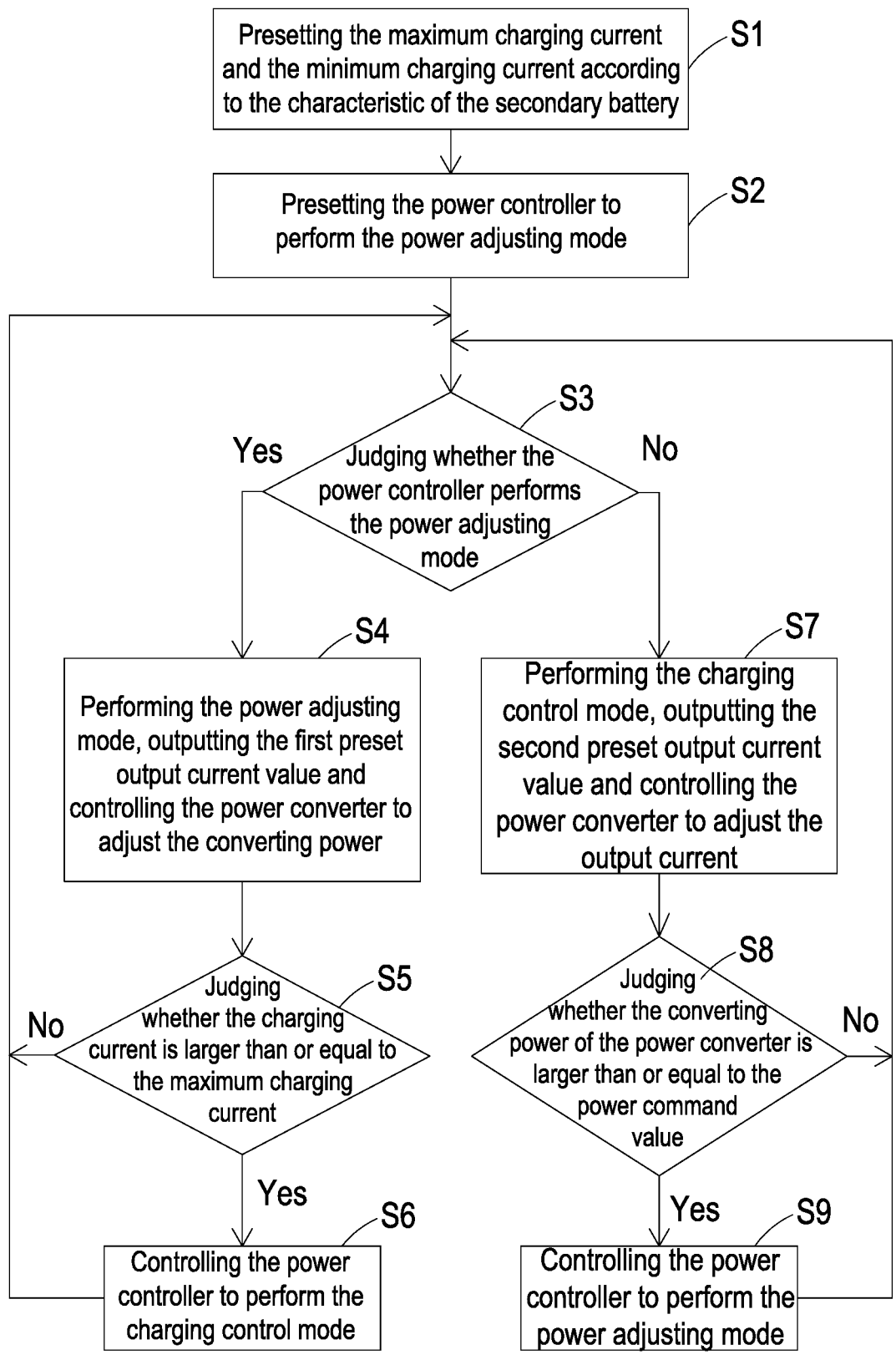
FIG. 7 is a flow chart illustrating a control method of the power controller applied in the power supply system.

FIG. 7 is a flow chart illustrating a control method of the power controller applied in the power supply system. The power supply system at least includes the power converter 11, the secondary battery 12 and the power controller 13. The power controller 13 performs the power adjusting mode or the charging control mode. The control method includes the following steps. Firstly, the step S1 is performed. When the power supply system 1 operates, the minimum charging current and the maximum charging current are set according to the characteristic of the secondary battery 12. After the step S1 is finished, the step S2 is performed. The power controller 13 is preset to perform the power adjusting mode. Then, the step S3 is performed to judge whether the power controller 13 performs the power adjusting mode. If the judging result of the step S3 is satisfied, the step S4 is performed. The power controller 13 performs the power adjusting mode. The first preset output current value Iref1 is outputted according to the converting voltage feedback value Vfbc, the converting current feedback value Ifbc and the power command value Pref. The power converter 11 is controlled to adjust the converting power Pc. Then, the step S5 is performed to judge whether the charging current I3 is larger than or equal to the maximum charging current. If the judging result of the step S5 is satisfied, the step S6 is performed to control the power controller 13 to perform the charging control mode, and the step S3 is performed again.

Moreover, if the judging result of the step S3 is not satisfied, the step S7 is performed. The power controller 13 performs the charging control mode. The second preset output current value Iref2 is outputted according to the charging current feedback value Ifb3 and the charging current threshold value Iref. The power converter 11 is controlled to adjust the output current I2. Then, the step S8 is performed to judge whether the converting power Pc of the power converter 11 is larger than or equal to the power command value Pref. If the judging result of the step S8 is satisfied, the step S9 is performed to control the power controller 13 to perform the power adjusting mode, and the step S3 is performed again.

In addition, if the judging result of the step S5 is not satisfied, the step S3 is performed. Furthermore, if the judging result of the step S8 is not satisfied, the step S3 is performed. In an embodiment, the relations among the charging current threshold value Iref, the maximum charging current and the minimum charging current are determined by the ripple of the charging current I3. For example, the maximum charging current can be 1.1 times the charging current threshold value Iref, and the minimum charging current can be 0.9 times the charging current threshold value Iref.

In an embodiment, the step S8 is not only performed to judge whether the converting power Pc is larger than or equal to the power command value Pref, but also performed to judge whether the charging current I3 is smaller than the minimum charging current. Therefore, if the judging result of the step S8 is satisfied, the step S9 is performed to control the power controller 13 to perform the power adjusting mode, and the step S3 is performed again.

From the above, while performing the control method of the present invention, the power controller 13 is controlled to perform the power adjusting mode or the charging control mode. In the power adjusting mode, the first preset output current value Iref1 is outputted. The converting current Ic of the power converter 11 is adjusted corresponding to the actual converting voltage Vc, and the converting power Pc of the power converter 11 is adjusted. Consequently, the output power is stabilized, the performance and durability are enhanced, and the control method can be applied in maximum power tracking function. In the charging control mode, the second preset output current value Iref2 is outputted for adjusting the converting current Ic of the power converter 11 accordingly, and the charging current I3 received by the secondary battery 12 is adjusted. Consequently, on a basis of the charging current threshold value Iref, the secondary battery 12 is charged by constant current and protected from overcharge current.

In an embodiment, while performing the control method of FIG. 7, the power supply controller 14 outputs the power command value Pref by another control method at the same time. The control method is described below.

Figure 8:
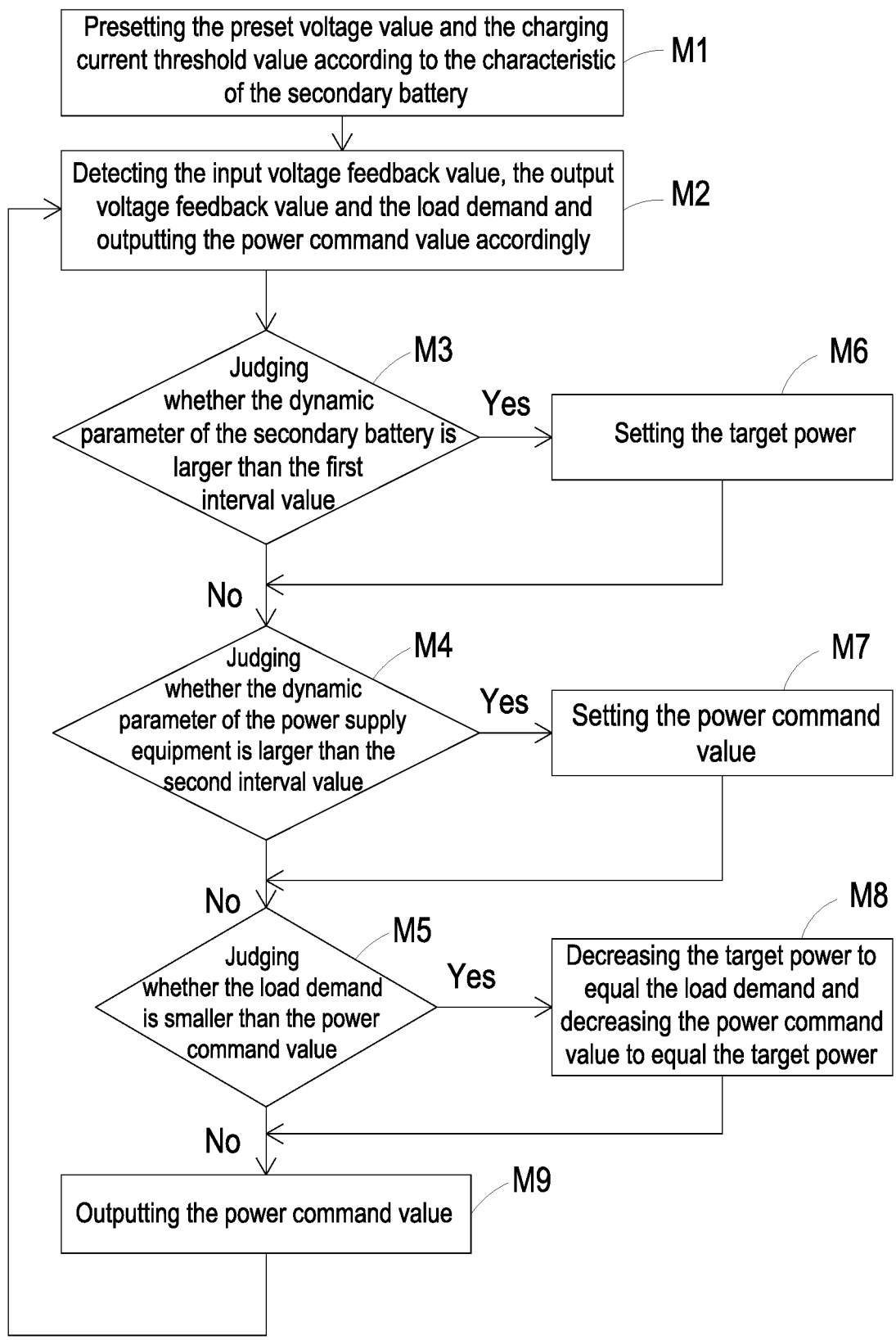
FIG. 8 is a preferred flow chart showing the power supply controller adjusting the power command value according to the state of the power supply system.

FIG. 8 is a preferred flow chart showing the power supply controller adjusting the power command value according to the state of the power supply system. Firstly, the step M1 is performed. According to the characteristic of the secondary battery 12, the power supply controller 14 presets the preset voltage value Vref to the power converter 11 and the power controller 13 and presets the charging current threshold value Iref to the power controller 13. Then, the step M2 is performed. The power supply controller 14 detects the input voltage feedback value Vfb1, the output voltage feedback value Vfb2 and the load demand Lr and outputs the power command value Pref. Then, the step M3 is performed to judge whether the dynamic parameter of the secondary battery 12 is larger than a first interval value. If the judging result of the step M3 is not satisfied, the step M4 is performed to judge whether the dynamic parameter of the power supply equipment 10 is larger than a second interval value. If the judging result of the step M4 is not satisfied, the step M5 is performed to judge whether the load demand Lr is smaller than the power command value Pref. If the judging result of the step M5 is not satisfied, the step M9 is performed, the power supply controller 14 outputs the power command value Pref to the power controller 13, and the step M2 is performed again.

In addition, if the judging result of the step M3 is satisfied, the step M6 is performed to set the target power Ptgt, and the step M4 is performed. If the judging result of the step M4 is satisfied, the step M7 is performed to set the power command value Pref, and the step M5 is performed. If the judging result of the step M5 is satisfied, the step M8 is performed. The target power Ptgt is decreased to equal the load demand Lr, and the power command value Pref is decreased to equal the target power Ptgt. Then, the step M9 is performed to output the power command value Pref to the power controller 13, and the step M2 is performed again. In this embodiment, the load demand Lr is a load power value. The dynamic parameter of the secondary battery 12 is the quantity of electricity of the secondary battery 12 or the output voltage V2 of the power converter 11.

Figure 9:
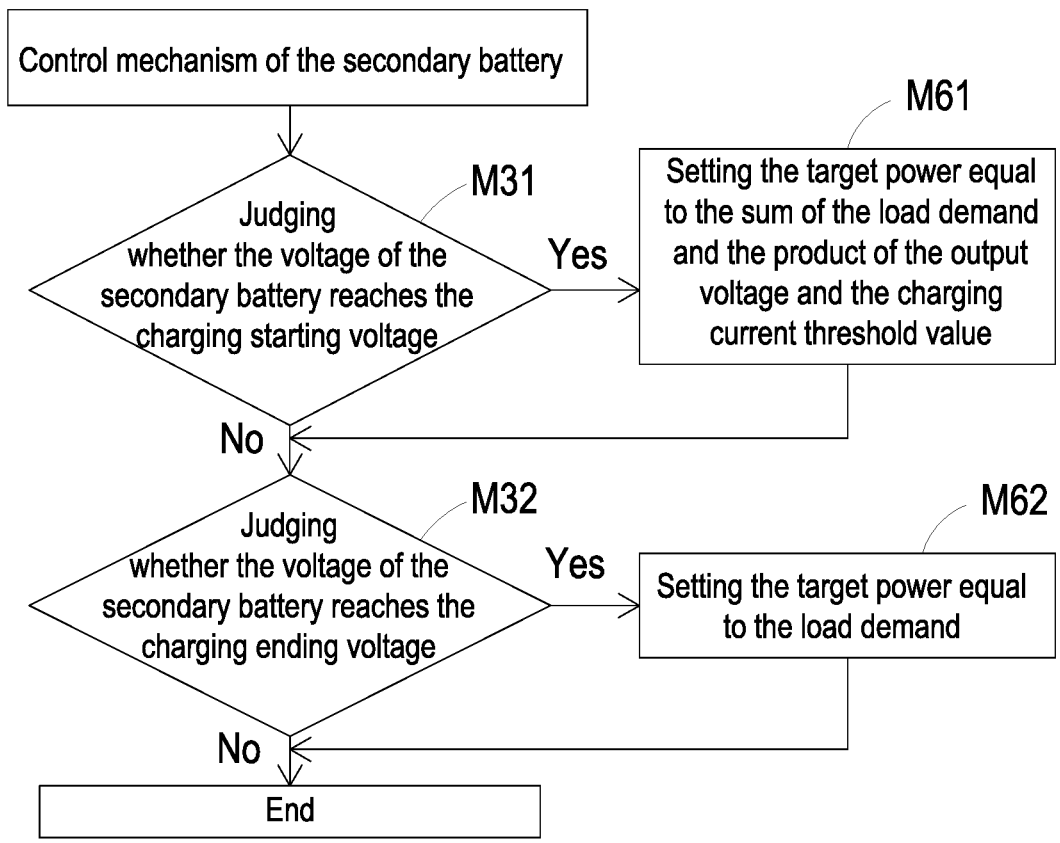
FIG. 9 is a flow chart showing a control mechanism of the secondary battery.

FIG. 9 is a flow chart showing the control mechanism of the secondary battery. The steps M3 and M6 are the control mechanism of the secondary battery, and the steps M3 and M6 can be further subdivided into the steps M31, M32, M61 and M62. The first interval value includes a first upper limit and a first lower limit. The step M31 is performed to judge whether the output voltage V2 (i.e., the voltage of the secondary battery 12) reaches the charging starting voltage via the converting voltage feedback value Vfbc, or judge whether the quantity of electricity of the secondary battery 12 is smaller than the first lower limit. The first lower limit is for example but not limited to include forty percentage of the maximum quantity of electricity of the secondary battery 12. According to the characteristic of the secondary battery 12, the charging starting is for example but not limited to be set at 3.0V (i.e., the cell voltage). If the judging result of the step M31 is not satisfied, the step M32 is performed to judge whether the output voltage V2 (i.e., the voltage of the secondary battery 12) reaches the charging ending voltage via the converting voltage feedback value Vfbc, or judge whether the quantity of electricity of the secondary battery 12 is larger than the first upper limit. The first upper limit is for example but not limited to include seventy percentage of the maximum quantity of electricity of the secondary battery 12. According to the characteristic of the secondary battery 12, the charging ending voltage is for example but not limited to include 3.6V (i.e., the cell voltage). If the judging result of the step M32 is not satisfied, the step M32 ends. If the judging result of the step M31 is satisfied, the step M61 is performed. The target power Ptgt is set equal to the sum of the load demand Lr and the product of the output voltage V2 and the charging current threshold value Iref (Ptgt= (V2*Iref)+Lr), and the step M32 is performed. If the judging result of the step M32 is satisfied, the step M62 is performed. The target power Ptgt is set equal to the load demand Lr, and the step M62 ends.

Figure 10:
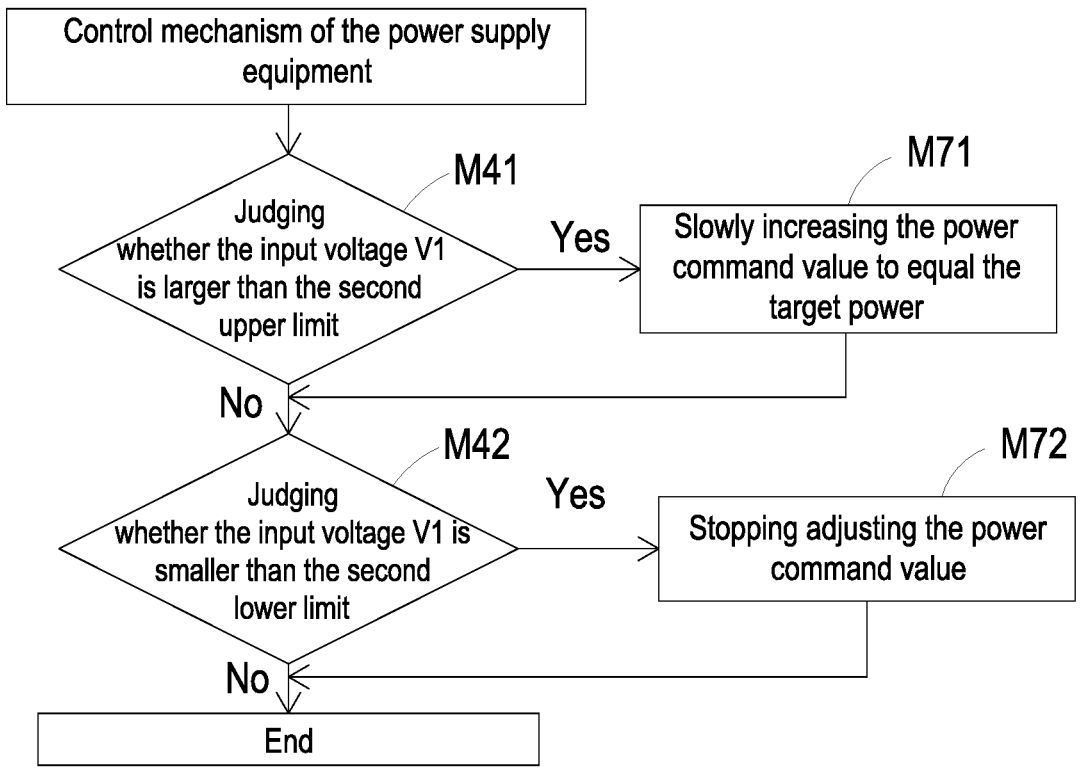
FIG. 10 is a flow chart showing a control mechanism of the power supply equipment.

FIG. 10 is a flow chart showing the control mechanism of the power supply equipment. The steps M4 and M7 are the control mechanism of the power supply equipment, and the steps M4 and M7 can be further subdivided into the steps M41, M42, M71 and M72. The second interval value includes a second upper limit and a second lower limit. The step M41 is performed to judge whether the input voltage V1 is larger than the second upper limit. The second upper limit of the power supply equipment 10 is for example but not limited to include 0.7V (i.e., the cell voltage). If the judging result of the step M41 is not satisfied, the step M42 is performed to judge whether the input voltage V1 is smaller than the second lower limit. The second lower limit of the power supply equipment 10 is for example but not limited to include 0.65V (i.e., the cell voltage). If the judging result of the step M42 is not satisfied, the step M42 ends. In addition, if the judging result of the step M41 is satisfied, the step M71 is performed. The power command value Pref is slowly increased to equal the target power Ptgt, and the step M42 is performed. Moreover, if the judging result of the step M42 is satisfied, the step M72 is performed to stop adjusting the power command value Pref, and the step M72 ends. The succeeding steps are shown in FIG. 8, and detailed descriptions thereof are omitted.

From the above descriptions, the present invention provides a power controller, a power supply system and device and control method thereof. When the converting power of the power converter is larger than or equal to the power command value, or when the charging current is smaller than the minimum charging current, the power controller is controlled to perform the power adjusting mode. According, the first preset output current value is outputted, and the converting current of the power converter is adjusted corresponding to the actual converting voltage. Namely, the converting power of the power converter is adjusted and controlled, and the converting power of the power supply equipment is controlled. Therefore, in the power adjusting mode, the converting power of the power supply equipment is adjustable, the performance is enhanced to stabilize the converting power, the durability is enhanced, and the power maximum point tracking function is realizable. In addition, when the charging current is larger than or equal to the maximum charging current, the power controller is controlled to perform the charging control mode. Accordingly, the second preset output current value is outputted, and the output current of the power converter is adjusted in accordance with the second preset output current value. The second preset output current value is set according to the charging current threshold value for realizing the charging with constant current. Therefore, in the charging control mode, the charging current received by the secondary battery is adjusted via adjusting the output current of the power converter. Meanwhile, the output voltage of the power converter is controlled via the power gain, and the secondary battery is charged by constant current and is protected. Moreover, the power supply system and the device and control method thereof can adjust the charging current received by the secondary battery in the charging control mode. Consequently, the power supply system only utilizes a single power converter rather than two power converters of the conventional power supply system. Namely, the cost and volume of the power supply system of the present invention are reduced relatively.

In summary, the present invention is able to protect the power supply equipment and the secondary battery, enhance the performance and durability of the power supply equipment, reduce the cost and volume of the power supply system, dynamically adjust the converting power, and be applied in the power point tracking function.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power controller for a power supply system, wherein the power controller provides a power adjusting mode and/or a charging control mode, so as to control a converting power or an output current of a power converter correspondingly, wherein the power adjusting mode is realized by a power control device, the power control device at least comprises: a divider for receiving a power gain and a power command value and outputting a first power parameter; a first multiplier for receiving a voltage gain and a converting voltage feedback value and outputting a second power parameter; and a second multiplier for receiving a converting current feedback value, the first power parameter and the second power parameter and outputting a first preset output current value, and the power converter adjusts the converting power according to the first preset output current value.

2. The power controller according to claim 1, wherein when the converting power of the power converter is larger than or equal to the power command value, the power controller performs the power adjusting mode so as to adjust the converting power of the power converter.

3. The power controller according to claim 1, wherein when a charging current provided by the power converter is smaller than a minimum charging current, the power controller performs the power adjusting mode so as to adjust the converting power of the power converter.

4. The power controller according to claim 1, wherein the power controller receives the converting voltage feedback value, the converting current feedback value, a charging current feedback value, a charging current threshold value and the power command value; when the power controller performs the power adjusting mode, the power controller provides the first preset output current value according to the converting voltage feedback value, the converting current feedback value and the power command value, the power converter adjusts the converting power according to the first preset output current value; when the power controller performs the charging control mode, the power controller provides a second preset output current value according to the charging current feedback value and the charging current threshold value, and the power converter adjusts the output current according to the second preset output current value.

5. The power controller according to claim 1, wherein the charging control mode is realized by a charging control device, the charging control device at least comprises: a third multiplier for receiving a current gain and a charging current feedback value and outputting a charging current parameter; and a fourth multiplier for receiving a charging current threshold value and the charging current parameter and outputting a second preset output current value, and the power converter adjusts the output current according to the second preset output current value.

6. The power controller according to claim 1, wherein when a charging current provided by the power converter is larger than or equal to a maximum charging current, the power controller performs the charging control mode so as to adjust the output current of the power converter.

7. The power controller according to claim 6, wherein the charging control mode is realized by a charging control device, the charging control device at least comprises: a third multiplier for receiving a current gain and a charging current feedback value and outputting a charging current parameter; and a fourth multiplier for receiving a charging current threshold value and the charging current parameter and outputting a second preset output current value, and the power converter adjusts the output current according to the second preset output current value.

8. A power supply system, at least comprises:
a power converter configured to receive and convert an input voltage and an input current into an output voltage and an output current, wherein a converting power of the power converter equals the product of a converting voltage and a converting current;
a secondary battery connected to the power converter and configured to receive a charging current provided by the output current; and
a power controller connected to the power converter and the secondary battery, wherein the power controller is configured to receive a converting voltage feedback value, a converting current feedback value, a charging current feedback value and a power command value and preset a maximum charging current and a minimum charging current according to a characteristic of the secondary battery,
wherein when the converting power of the power converter is larger than or equal to the power command value, the power controller is controlled to perform a power adjusting mode for adjusting the converting power of the power converter, wherein when the charging current is larger than or equal to the maximum charging current, the power controller is controlled to perform a charging control mode for adjusting the output current of the power converter.

9. The power supply system according to claim 8, wherein when the power controller performs the power adjusting mode, the power controller provides a first preset output current value according to the converting voltage feedback value, the converting current feedback value and the power command value, the power converter adjusts the converting power according to the first preset output current value; when the power controller performs the charging control mode, the power controller provides a second preset output current value according to the charging current feedback value and a charging current threshold value, and the power converter adjusts the output current according to the second preset output current value; the converting voltage is the input voltage or the output voltage, the converting current is the input current or the output current, the converting voltage feedback value is an input voltage feedback value or an output voltage feedback value, the converting current feedback value is an input current feedback value or an output current feedback value, and the converting power is an input power or an output power.

10. The power supply system according to claim 8, wherein the power controller further judges and performs the power adjusting mode to adjust the converting power of the power converter when the charging current is smaller than the minimum charging current.

11. The power supply system according to claim 10, wherein when the power controller performs the power adjusting mode, the power controller provides a first preset output current value according to the converting voltage feedback value, the converting current feedback value and the power command value, the power converter adjusts the converting power according to the first preset output current value; when the power controller performs the charging control mode, the power controller provides a second preset output current value according to the charging current feedback value and a charging current threshold value, and the power converter adjusts the output current according to the second preset output current value;
the converting voltage is the input voltage or the output voltage, the converting current is the input current or the output current, the converting voltage feedback value is an input voltage feedback value or an output voltage feedback value, the converting current feedback value is an input current feedback value or an output current feedback value, and the converting power is an input power or an output power.

12. The power supply system according to claim 11, wherein the first preset output current value is a product of the converting current feedback value, a first power parameter and a second power parameter, the first power parameter equals a power gain divided by the power command value, the second power parameter equals a voltage gain multiplied by the converting voltage feedback value, the second preset output current value is a product of a charging current parameter and the charging current threshold value, and the charging current parameter equals a current gain multiplied by the charging current feedback value.

13. The power supply system according to claim 11, wherein the power adjusting mode is realized by a power control device, the power control device at least comprises: a divider for receiving a power gain and the power command value and outputting a first power parameter; a first multiplier for receiving a voltage gain and the converting voltage feedback value and outputting a second power parameter; and a second multiplier for receiving the converting current feedback value, the first power parameter and the second power parameter and outputting the first preset output current value, the converting power of the power converter is controlled according to the first preset output current value, the power command value is determined according to a load demand or the input voltage provided by the power supply equipment, the voltage gain is determined according to the converting voltage, and the power gain is preset according to the characteristic of the secondary battery and is adjusted according to the relation between the power gain and the power command value.

14. The power supply system according to claim 11, wherein the charging control mode is realized by a charging control device, the charging control device at least comprises: a third multiplier for receiving a current gain and the charging current feedback value and outputting a charging current parameter; and a fourth multiplier for receiving the charging current threshold value and the charging current parameter and outputting the second preset output current value, the output current of the power converter is controlled according to the second preset output current value, and the current gain is determined according to the charging current.

15. The power supply system according to claim 8, further comprising:
a load module providing a load demand;
a power supply equipment configured to provide the input voltage and the input current; and
a power supply controller connected to the power supply equipment, the power converter, the power controller and the load module, wherein the power supply controller is configured to generate the power command value according to the input voltage feedback value, the output voltage feedback value and the load demand and preset the charging current threshold value and a preset voltage value according to the characteristic of the secondary battery.

16. The power supply system according to claim 15, wherein the power supply controller at least comprises:
plural first signal converters connected to the power supply equipment, the power converter and the load module respectively, wherein the plural first signal converters are configured to convert plural signals of the input voltage feedback value, the output voltage feedback value and the load demand;
a microprocessor connected to the plural first signal converters for receiving the converted signals and generating the power command value accordingly, wherein the microprocessor presets the charging current threshold value and the preset voltage value according to the characteristic of the secondary battery; and
plural second signal converters connected to the microprocessor and the power controller respectively and configured to convert plural signals of the power command value, the charging current threshold value and the preset voltage value.

17. The power supply system according to claim 16, wherein the plural signals converted by the plural second signal converters are transmitted to the power controller, the power controller outputs the first preset output current value or the second preset output current value for controlling the converting power or the output current of the power converter, the signal of the preset voltage value is transmitted to the power converter, and the load demand is a load power value, a throttle amount, a speed value, a brake signal value or an illumination value.

18. The power supply system according to claim 15, wherein a control method of the power supply controller at least comprises steps of:
(i1) presetting the preset voltage value and the charging current threshold value according to the characteristic of the secondary battery;
(i2) detecting the input voltage feedback value, the output voltage feedback value and the load demand and outputting the power command value accordingly;
(i3) judging whether a dynamic parameter of the secondary battery is larger than a first interval value;
(i4) judging whether a dynamic parameter of the power supply equipment is larger than a second interval value;
(i5) judging whether the load demand is smaller than the power command value;
(i6) setting a target power;
(i7) setting the power command value;
(i8) decreasing the target power to equal the load demand and decreasing the power command value to equal the target power; and
(i9) outputting the power command value,
wherein after the step (i1) is finished, the step (i2) is performed, after the step (i2) is finished, the step (i3) is performed, if the judging result of the step (i3) is not satisfied, the step (i4) is performed, if the judging result of the step (i4) is not satisfied, the step (i5) is performed, if the judging result of the step (i5) is not satisfied, the step (i9) is performed, after the step (i9) is finished, the step (i2) is performed again; if the judging result of the step (i3) is satisfied, the step (i6) is performed, after the step (i6) is finished, the step (i4) is performed; if the judging result of the step (i4) is satisfied, the step (i7) is performed, after the step (i7) is finished, the step (i5) is performed; if the judging result of the step (i5) is satisfied, the step (i8) is performed, after the step (i8) is finished, the step (i9) is performed.

19. The power supply system according to claim 18, wherein the step (i3) and the step (i6) are a control mechanism of the secondary battery and are subdivided into steps of:
(i31) judging whether a voltage of the secondary battery reaches a charging starting voltage;
(i32) judging whether the voltage of the secondary battery reaches a charging ending voltage;
(i61) setting the target power equal to a sum of the load demand and a product of the output voltage and the charging current threshold value; and
(i62) setting the target power equal to the load demand,
wherein if the judging result of the step (i31) is not satisfied, the step (i32) is performed, if the judging result of the step (i32) is not satisfied, the steps end; if the judging result of the step (i31) is satisfied, the step (i61) is performed, after the step (i61) is finished, the step (i32) is performed; if the judging result of the step (i32) is satisfied, the step (i62) is performed, after the step (i62) is finished, the steps end.

20. The power supply system according to claim 19, wherein the first interval value comprises a first upper limit and a first lower limit, in the step (i31), further judging whether a quantity of electricity of the secondary battery is smaller than the first lower limit, in the step (i32), further judging whether the quantity of electricity of the secondary battery is larger than the first upper limit, the power supply controller presets the charging current threshold value according to the characteristic of the secondary battery, the load demand is a load power value, a throttle amount, a speed value, a brake signal value or an illumination value, and the dynamic parameter of the secondary battery is the quantity of electricity of the secondary battery or the output voltage of the power converter.

21. The power supply system according to claim 18, wherein the second interval value comprises a second upper limit and a second lower limit, the step (i4) and the step (i7) are a control mechanism of the power supply equipment and are subdivided into steps of:
(i41) judging whether the input voltage feedback value is larger than the second upper limit;
(i42) judging whether the input voltage feedback value is smaller than the second lower limit;
(i71) slowly increasing the power command value to equal the target power; and
(i72) stopping adjusting the power command value;
wherein if the judging result of the step (i41) is not satisfied, the step (i42) is performed, if the judging result of the step (i42) is not satisfied, the steps end; if the judging result of the step (i41) is satisfied, the step (i71) is performed, after the step (i71) is finished, the step (i42) is performed; if the judging result of the step (i42) is satisfied, the step (i72) is performed, after the step (i72) is finished, the steps end.

22. A control method of a power controller for a power supply system, the power supply system at least comprising a power converter, a secondary battery and the power controller, the power controller performing a power adjusting mode or a charging control mode, the control method comprising steps of:
(a) presetting a maximum charging current and a minimum charging current according to a characteristic of the secondary battery when the power supply system operating;
(b) presetting the power controller to perform the power adjusting mode;
(c) judging whether the power controller performs the power adjusting mode;
(d) performing the power adjusting and outputting a first preset output current value;
(e) judging whether the charging current is larger than or equal to the maximum charging current;
(f) controlling the power controller to perform the charging control mode;
(g) performing the charging control mode and outputting a second preset output current value;
(h) judging whether a converting power of the power converter is larger than or equal to a power command value; and
(i) controlling the power controller to perform the power adjusting mode;
wherein the step (a) is performed firstly, after the step (a) is finished, the step (b) is performed, the step (c) is performed, if the judging result of the step (c) is satisfied, the step (d) is performed, after the step (d) is performed, the step (e) is performed, if the judging result of the step (e) is satisfied, the step (f) is performed, after the step (f) is finished, the step (c) is performed again; if the judging result of the step (c) is not satisfied, the step (g) is performed, after the step (g) is performed, the step (h) is performed, if the judging result of the step (h) is satisfied, the step (i) is performed, after the step (i) is finished, the step (c) is performed again; if the judging result of the step (e) is not satisfied, the step (c) is performed again; if the judging result of the step (h) is not satisfied, the step (c) is performed again.

23. The control method according to claim 22, wherein the first preset output current value is a product of a converting current feedback value, a first power parameter and a second power parameter, the first power parameter equals a power gain divided by the power command value, the second power parameter equals a voltage gain multiplied by a converting voltage feedback value, the voltage gain is determined according to a converting voltage, and the power adjusting mode is realized by a power control device.

24. The control method according to claim 22, wherein the second preset output current value is a product of a charging current parameter and a charging current threshold value, the charging current parameter equals a current gain multiplied by a charging current feedback value, the current gain is preset according to the charging current threshold value, and the charging control mode is realized by a charging control device.

25. The control method according to claim 22, wherein after the step (h), the control method further comprises a step (h1) of judging whether the charging current is smaller than the minimum charging current, after the (h) is finished, the step (h1) is performed, if the judging result of the step (h1) is satisfied, the step (i) is performed, if the judging result of the step (h1) is not satisfied, the step (c) is performed again; in the step (d), the power controller controls the power converter to adjust the converting power according to the first preset output current value; in the step (g), the power controller controls the power converter to adjust the output current according to the second preset output current value.

26. The control method according to claim 25, wherein the second preset output current value is a product of a charging current parameter and a charging current threshold value, the charging current parameter equals a current gain multiplied by a charging current feedback value, the current gain is preset according to the charging current threshold value, and the charging control mode is realized by a charging control device.

27. The control method according to claim 25, wherein the first preset output current value is a product of a converting current feedback value, a first power parameter and a second power parameter, the first power parameter equals a power gain divided by the power command value, the second power parameter equals a voltage gain multiplied by a converting voltage feedback value, the voltage gain is determined according to a converting voltage, and the power adjusting mode is realized by a power control device.

28. The control method according to claim 27, wherein the second preset output current value is a product of a charging current parameter and a charging current threshold value, the charging current parameter equals a current gain multiplied by a charging current feedback value, the current gain is preset according to the charging current threshold value, and the charging control mode is realized by a charging control device.

* * * * *